(12) United States Patent
Therien et al.

(10) Patent No.: US 7,017,060 B2
(45) Date of Patent: Mar. 21, 2006

(54) POWER MANAGEMENT SYSTEM THAT CHANGES PROCESSOR LEVEL IF PROCESSOR UTILIZATION CROSSES THRESHOLD OVER A PERIOD THAT IS DIFFERENT FOR SWITCHING UP OR DOWN

(75) Inventors: Guy Therien, Beaverton, OR (US); Michael Walz, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 09/812,411

(22) Filed: Mar. 19, 2001

(65) Prior Publication Data

US 2002/0133729 A1    Sep. 19, 2002

(51) Int. Cl.
*G06F 1/26* (2006.01)
(52) U.S. Cl. .................. 713/323; 713/320; 713/322
(58) Field of Classification Search ............... 713/323
See application file for complete search history.

(56) References Cited

U.S. PATENT DOCUMENTS

| | | | |
|---|---|---|---|
| 5,021,679 A | 6/1991 | Fairbanks et al. | |
| 5,153,535 A | 10/1992 | Fairbanks et al. | |
| 5,307,003 A | 4/1994 | Fairbanks et al. | |
| 5,627,412 A | 5/1997 | Beard | |
| 5,752,011 A | 5/1998 | Thomas et al. | |
| 5,974,557 A | 10/1999 | Thomas et al. | |
| 6,029,249 A | 2/2000 | Atkinson | |
| 6,076,171 A | 6/2000 | Kawata | |
| 6,192,479 B1 | 2/2001 | Ko | |
| 6,216,235 B1 | 4/2001 | Thomas et al. | |
| 6,487,668 B1 | 11/2002 | Thomas et al. | |
| 6,574,739 B1 * | 6/2003 | Kung et al. ............... 713/322 |
| 6,584,571 B1 * | 6/2003 | Fung ........................ 713/310 |
| 6,684,341 B1 * | 1/2004 | Malcolm et al. ............ 713/320 |
| 6,829,713 B1 * | 12/2004 | Cooper et al. ............. 713/320 |

FOREIGN PATENT DOCUMENTS

GB     2 246 455 A    1/1992

OTHER PUBLICATIONS

PCT Search Report, International Application No. PCT/US 02/02028, mailed Apr. 9, 2003, (6 pages).

* cited by examiner

*Primary Examiner*—Albert Wang
(74) *Attorney, Agent, or Firm*—Blakely, Sokoloff, Taylor & Zafman LLP

(57) ABSTRACT

A method for automatically transitioning a processor to another performance level in a demand-based system. One embodiment of the invention provides for the automatic adjustment of processor frequency while preserving system responsiveness. The performance-level policy algorithm detects increased processor utilization quickly enough that transition to a higher performance level is comparable to maximum system performance. The performance-level policy algorithm delays processor transition to a lower performance level so that quick reversals in demand do not precipitate unnecessary transitioning.

17 Claims, 3 Drawing Sheets

POWER MANAGEMENT SYSTEM THAT CHANGES PROCESSOR LEVEL IF PROCESSOR UTILIZATION CROSSES THRESHOLD OVER A PERIOD THAT IS DIFFERENT FOR SWITCHING UP OR DOWN

FIELD OF THE INVENTION

The present invention relates generally to computer processor power management, and more specifically to an improved method for determining optimum performance level transition points.

BACKGROUND OF THE INVENTION

Mobile PC manufacturers compete to increase system performance while reducing or at least maintaining power consumption. Mobile PC performance has increased dramatically. However, because it is not desirable to have larger batteries, and battery efficiency has not kept pace with processor performance, battery life for systems operating at peak performance has been drastically reduced. Manufacturers introduced the capability of power and performance control to prolong battery life. For example, a user watching a movie may wish to lower power consumption at the cost of diminished quality in order to prolong battery life long enough to complete the movie. Power and performance control is also used to control thermals. For example if a processor is overheating, the user may lower the performance thus lowering the power consumption and thus reducing the heat. In a typical power management system (PMS) the user provides a series of inputs to the power management portion of the operating system (OS). Alternatively, the PMS might be an embedded part of the OS. The user might input a preference toward battery life or toward system performance. The user might indicate energy conservation for DC operation and system performance optimization for AC operation.

Historically, the reduction in power consumption had a linear relationship to the reduction in system performance. For example, a system running at 500 Mhz and using 10 watts could be throttled down to 250 Mhz and use 5 watts. When a system is run against a fixed workload, a PMS exhibiting this linear relationship provides little benefit in the way of prolonged battery life. That is, a system running at half the speed for twice as long will accomplish the same amount for the expended energy. The system will run cooler, but no more work is accomplished.

More recent systems address this concern by taking advantage of the equation governing power consumption in CMOS circuits. This equation is $P=kV^2F$, where P is the power consumed, k is some constant, V is the applied voltage and F is the operating frequency. Application of this equation shows that a small reduction in voltage may provide a large reduction in power consumption. Using a voltage-varying scheme in which the power is applied over time, therefore, allows for fixed workload to be accomplished with less energy and hence prolonged battery life. A typical PMS would provide a high-voltage/high-frequency mode for AC use and a low-voltage/low-frequency mode for DC use. The modes are implemented by a software program which detects whether the AC adapter has been plugged in, or not, and switches mode accordingly. The user could also provide input to the system and, if desired, choose not to switch to low performance mode. The PMS software may be incorporated within the OS and indicates to an application and driver that the power source has changed, the driver then communicates with the firmware that switches modes.

Although such a PMS prolongs battery life, it does not address the issue of reduced performance. While on battery the system runs at a lower frequency and the user does not get the full benefit of system performance. If the user places the system into a high performance mode the battery life is diminished.

BRIEF DESCRIPTION OF THE DRAWINGS

Embodiment of the present invention are illustrated by way of example and not intended to be limited by the figures of the accompanying drawings in which like references indicate similar elements and in which.

DETAILED DESCRIPTION

An embodiment of the present invention provides a method for transition of processor performance levels in a demand-based system. A performance level is a specified operating frequency and its associated voltage. Automatic transition may use less transition overhead, thereby extending battery life. An embodiment of the invention provides for the automatic adjustment of processor frequency while preserving system responsiveness. In one embodiment of the invention the processor may be transitioned to multiple performance levels.

Figure 1:
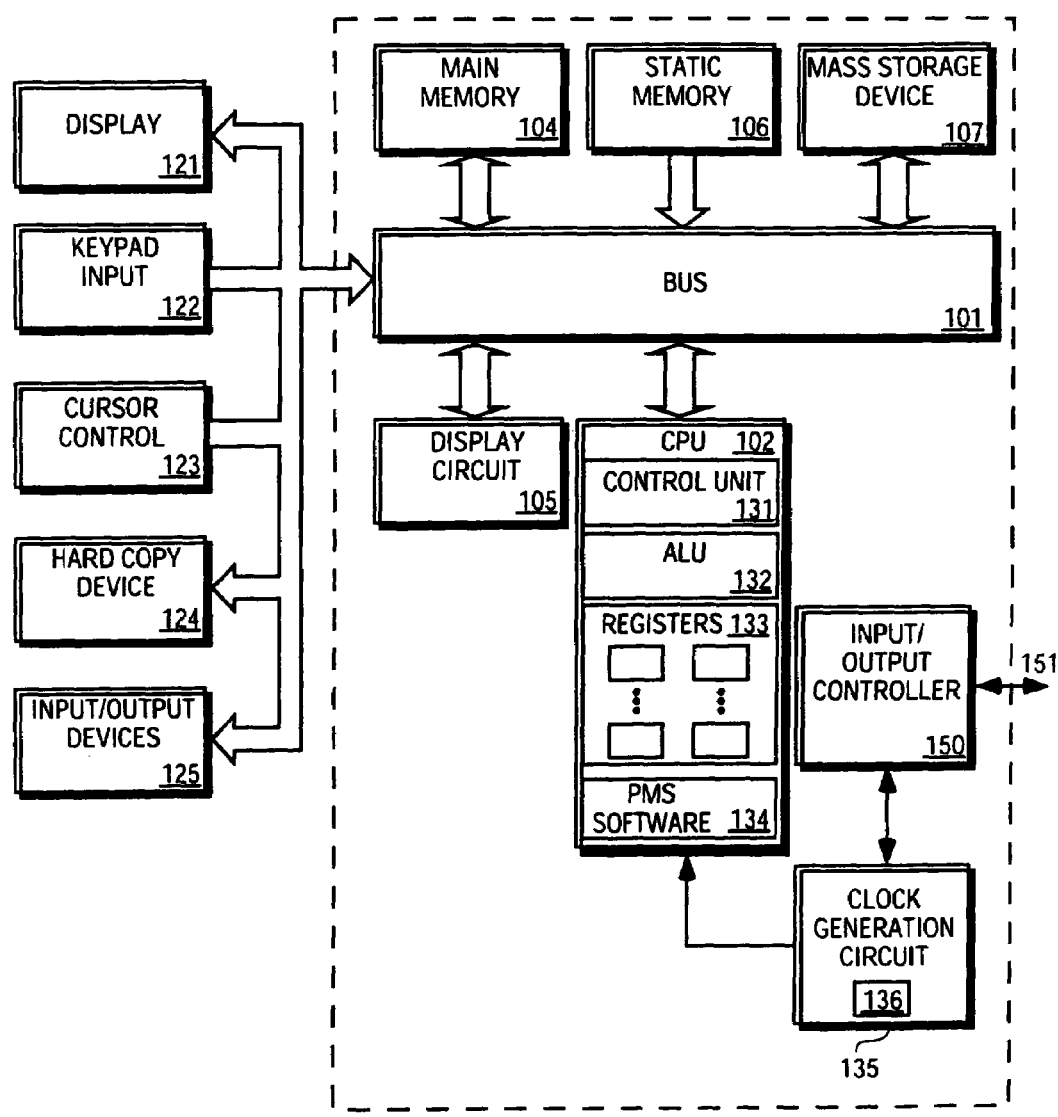
FIG. 1 illustrates a computing system for implementing one embodiment of the present invention.

FIG. 1 is a diagram illustrating an exemplary computer system 100 for implementing one embodiment of the present invention. The sampling of processor utilization, the detection of a change in processor utilization, and the transition of the processor to a different performance level, described herein, may be implemented and utilized within computing system 100. Computing system 100 may represent a general-purpose computer, portable computer, or other like device. The components of computing system 100 are exemplary in which one or more components may be omitted or added.

Referring to FIG. 1, computing system 100 includes a central processing unit 102 coupled to a display circuit 105, main memory 104, static memory 106, and mass storage device 107 via bus 101. Computing system 100 may also be coupled to a display 121, keypad input 122, cursor control 123, hard copy device 124, and input/output (I/O) devices 125 via bus 101. Computing system 100 may contain frequency and voltage regulation circuitry as described below.

Bus 101 is a standard system bus for communicating information and signals. Processor 102 is a processing unit for computing system 100. Processor 102 may be used to process information for computing system 100. Processor 102 includes a control unit 131, an arithmetic logic unit (ALU) 132, and several registers 133, which are used to process information.

Main memory 104 may be, e.g., a random access memory (RAM) or some other dynamic storage device, for storing information or instructions (program code), which are used by processor 102. Main memory 104 may also store temporary variables or other intermediate information during execution of instructions by processor 102. Static memory 106, may be, e.g., a read only memory (ROM) and/or other static storage devices, for storing information or instructions, which may also be used by processor 102. Mass storage device 107 may be, e.g., a hard or floppy disk drive or optical disk drive, for storing information or instructions for computing system 100.

Display 121 may be, e.g., a cathode ray tube (CRT) or liquid crystal display (LCD). Display device 121 displays information or graphics to a user. Computing system 100 may interface with display 121 via display circuit 105. Keypad input 122 is a alphanumeric input device for communicating information and command selections to computing system 100. Cursor control 123 may be, e.g., a mouse, a trackball, or cursor direction keys, for controlling movement of an object on display 121. Hard copy device 124 may be, e.g., a laser printer, for printing information on paper, film, or some other like medium. A number of input/output devices 125 may be coupled to computing system 100.

In one embodiment of the invention, processor 102 may also contain power management software 134 to allow user control of operating voltage and operating frequency. The power management software 134 may configure an I/O controller 150 to facilitate voltage and frequency scaling upon the occurrence of specified conditions. I/O controller 150 programs a register 136 within a clock generation circuit 135. The programmed information indicates how the operating frequency of the clocking signal is to be altered. The clock generation circuit 135 monitors the register 136 and modifies the frequency of the clocking signals accordingly. After determining that the operating frequency has been reduced the I/O controller 150 generates a voltage modification control signal to a power supply circuit, not shown. The power supply circuit then reduces the voltage accordingly.

The processor performance level transition policy algorithm, described herein, may be implemented by hardware and/or software contained within computing system 100. For example, processor 102 may execute code or instructions stored in a machine-readable medium, e.g., main memory 104, to decide when to transition the processor performance level on a processor that supports multiple performance levels.

The machine-readable medium may include a mechanism that provides (i.e., stores and/or transmits) information in a form readable by a machine such as computer. For example, a machine-readable medium may include a read only memory (ROM), random access memory (RAM), magnetic disk storage media, optical storage media, flash memory devices. The code or instructions may be represented by carrier wave signals, infrared signals, digital signals, and by other like signals.

Figure 2A:
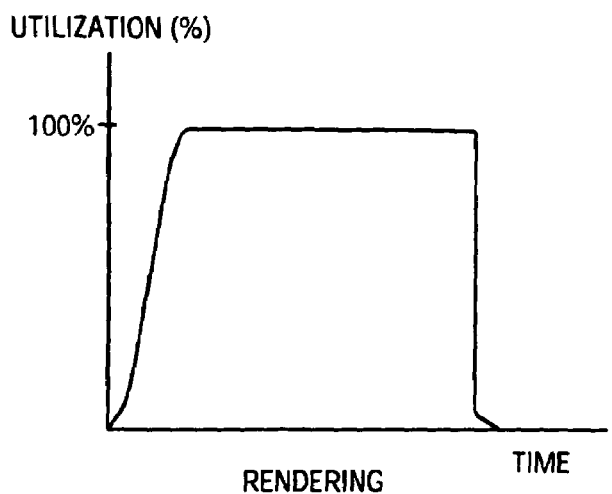
FIG. 2 illustrates an embodiment of processor utilization graphs.
Figure 2B:
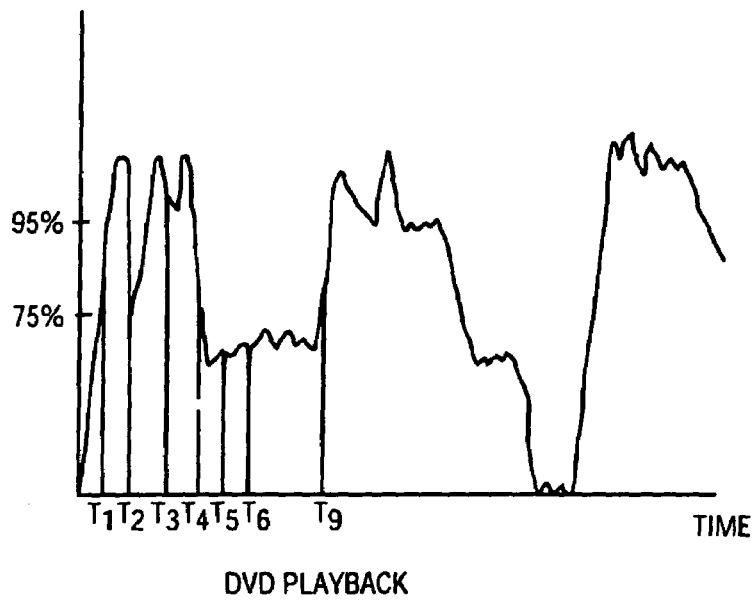
Figure 2C:
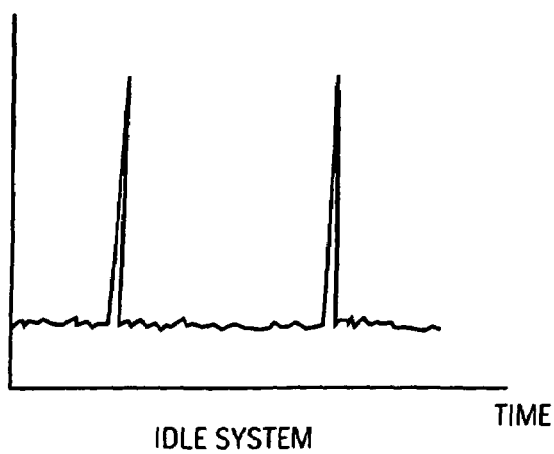

PMS may have several inputs into the software. The software may use these inputs to determine a performance level for the processor. Typically, the inputs include "power source", high performance level for AC and low performance level for DC; "thermal", an overriding environmental concern which will transition the processor to a lower (i.e., cooler) performance level if the processor overheats; and "user preference", whereby a user may chose between conserving energy and increased performance. A demand-based PMS includes the input of "processor utilization" to allow for a transition to a higher performance level if the user has need of a higher level of performance. An embodiment of the present invention employs a fast up/slow down (FUSD) transition policy to monitor user demand upon the processor (i.e. processor utilization). An alternative embodiment may employ a slow up/fast down (SUFD) transition policy. The monitoring may be done by periodically reading the processor's Time Stamp Counter (TSC) and a high-resolution timer or utilizing existing native OS mechanisms. The TSC provides information about processor activity when the processor is not in a sleep state. The calculation of processor activity and frequency provides the utilization over a given period. Exemplary graphs of processor utilization for some typical workloads are shown in FIG. 2. FIG. 2a shows the processor utilization graph of, for example, a rendering. As shown the processor utilization rises quickly to near 100% and remains at a high level until the processing is complete. FIG. 2b shows the processor graph for a digital video disc (DVD). The processor utilization rises to a high level for extended periods and occasionally drops to significantly lower levels. FIG. 2c shows the processor graph for an idle system. As shown the processor utilization is at low level with the exception of spikes due to periodic OS housekeeping. An embodiment of the present invention will quickly detect a high processor utilization level and automatically switch the system to a high frequency performance level. When processor utilization drops off, the system is automatically switched to a low performance level. The ability to quickly transition between performance levels is not critical for a workload having a processor utilization graph as shown in FIGS. 2a and 2c. For workload such as that shown in FIG. 2b, however, quickly detecting changes in processor utilization and transitioning to an optimum performance level, may significantly improve energy efficiency.

In accordance with on embodiment of the present invention, processor utilization is measured every T seconds. The processor-utilization monitoring period, T, should be small enough so that increased processor utilization is detected quickly, this maintains the responsiveness of the system. T should not be so small, however, as to overly tax the processor resources. When processor utilization is detected above a given threshold the system is automatically switched to a higher performance level. When processor utilization is detected below a given threshold the system is automatically switched to a lower performance level. Frequent switching between higher and lower performance levels taxes the processor, therefore the FUSD transition policy allows for less frequent switching from a high performance level to a lower one so that quick reversals in processor utilization will not result in frequent switching. For example, as shown in FIG. 2b the processor utilization reaches a switch-up threshold of, for example, 95% at time $T_1$. The system automatically transitions to a higher performance level. At time $T_2$ the processor utilization drops below a switch-down threshold, for example 75%, but the system does not transition to a lower performance level. Instead, current performance level is maintained until processor utilization is monitored at time $T_3$. At time $T_3$ the processor utilization is again above the switch-up threshold so the higher performance level is maintained. When, at time $T_4$–$T_6$ the processor utilization level remains below the switch-down threshold for 3T seconds, the system is then transitioned to a lower performance level. The system remains at this lower performance level until the processor utilization once again rises above the switch-up threshold (i.e., until time $T_9$).

Figure 3:
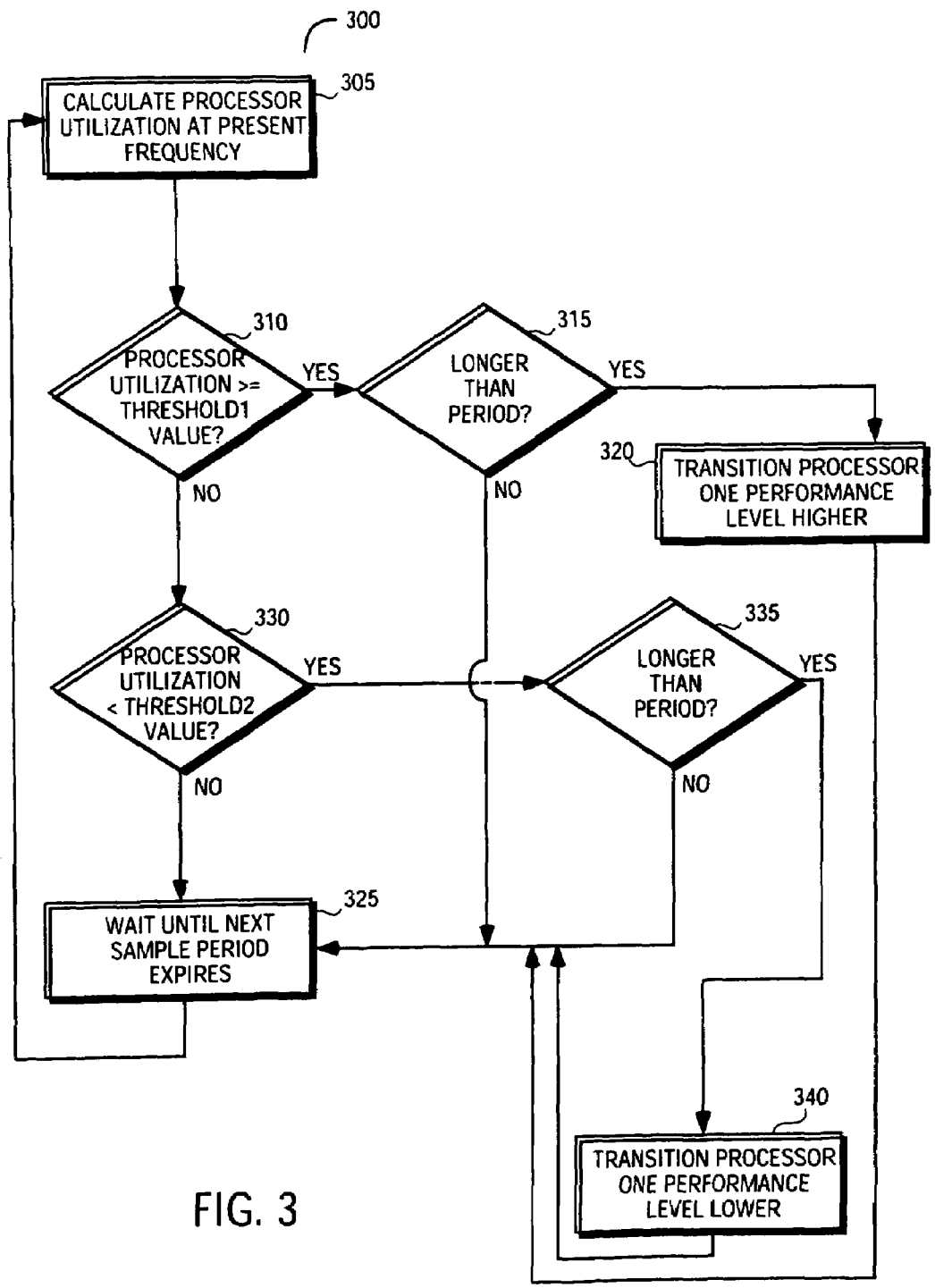
FIG. 3 illustrates an embodiment of a process for calculating processor utilization.

FIG. 3 is a process flow diagram in accordance with one embodiment of the present invention. The process 300, shown in FIG. 3 begins at operation 305 in which the processor utilization is calculated for the current performance level (i.e., at the current frequency). This calculation may be completed every T seconds. As described above, T is selected to be small enough to quickly detect an increase in processor utilization while not being so small as to unduly tax processor resources. Empirically, for one embodiment, a value of 150 milliseconds (ms) for T has been found to be adequate for typical systems with typical processor utilization graphs. At operation 310 the system determines if processor utilization is above a specified switch-up threshold. For one embodiment of the present invention the switch-up threshold is specified as 95% of the current performance level. If processor utilization is above the specified switch-up threshold, the system determines if processor utilization has been above this threshold longer than the switch-up period at operation 315. The switch-up period may be equal to one or more processor-utilization monitoring periods T. For one embodiment the processor monitoring period is equal to 150 ms and the switch-up period is equal to 300 ms.

If processor utilization has not been above the switch-up threshold longer than the switch-up period, the system waits until the next processor-utilization monitoring period, T, expires at operation 325 and returns to operation 305. If processor utilization has been above the switch-up threshold longer than the switch-up period the system automatically transitions to the next higher performance level at operation 320 and then proceeds to operation 325 as described above.

Referring again to operation 310, if the system determines that processor utilization is not above the switch-up threshold, the system determines if processor utilization is below a specified switch-down threshold at operation 330. For one embodiment of the present invention the switch-down threshold is specified as 95% of the next lower performance level. If processor utilization is below the specified switch-down threshold, the system determines if processor utilization has been below the switch-down threshold longer than the switch-down period at operation 335. The switch-down period may be different than the switch-up period. For one embodiment the switch-up period is equal to 300 ms and the switch-down period is equal to 1000 ms. If processor utilization has not been below the switch-down threshold longer than the switch-down period, the system waits until the next processor-utilization monitoring period, T, expires at operation 325 and returns to operation 305. If processor utilization has been below the switch-down threshold longer than the switch-down period the system automatically transitions to the next lower performance level at operation 340 and then proceeds to operation 325 as described above.

Referring again to operation 330, if the system determines that processor utilization is not below the switch-down threshold, the system waits until the next processor-utilization monitoring period, T, expires at operation 325 and returns to operation 305.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
monitoring, by a power management system (PMS) included in a processor, processor utilization of a computer system having the processor coupled to a power supply circuit, and a power supply coupled to the power supply circuit, the processor having a plurality of performance levels;
automatically transitioning the processor to a higher performance level if it is determined that the processor utilization has remained above a switch-up level for a first specified time; and
automatically transitioning the processor to a next lower performance level, if any, if it is determined that the processor utilization has remained below a switch-down level for a second specified time, wherein the transitioning of the processor is initiated via a signal that an input/output (I/O) controller, in response to an external signal, transmits to the power supply circuit.

2. The method of claim 1, wherein the number of performance levels is two.

3. The method of claim 1, wherein the switch-up level is approximately 95% of a current processor performance level.

4. The method of claim 1, wherein the switch-down level is approximately 95% of the next lower processor performance level.

5. The method of claim 1 wherein the first specified time is greater than the second specified time.

6. The method of claim 1 wherein the second specified time is greater than the first specified time.

7. A machine-readable medium having stored thereon data representing sets of instructions which, when executed by a machine, cause the machine to:
monitor, by a power management system (PMS) included in a processor, processor utilization of a computer system having the processor coupled to a power supply circuit and a power supply coupled to the power supply circuit, the processor having a plurality of performance levels;
automatically transition the processor to a higher performance level if it is determined that the processor utilization has remained above a switch-up level for a first specified time; and
automatically transition the processor to a next lower performance level, if any, if it is determined that the processor utilization has remained below a switch-down level for a second specified time, wherein the transitioning of the processor is initiated via a signal that an input/output (I/O) controller, in response to an external signal, transmits to the power supply circuit.

8. The machine-readable medium of claim 7, wherein the number of performance levels is two.

9. The machine-readable medium of claim 7, wherein the switch-up level is approximately 95% of a current processor performance level.

10. The machine-readable medium of claim 7, wherein the switch-down level is approximately 95% of the next lower processor performance level.

11. The machine-readable medium of claim 7, wherein the first specified time that the processor utilization has remained above a switch-up level to transition the processor to a higher performance level is greater than a processor-utilization monitoring period.

12. The machine-readable medium of claim 11, wherein the specified period of time that the processor utilization has remained below a switch-down level to transition the processor to a next lower performance level is equal to the processor-utilization monitoring period.

13. The machine-readable medium of claim 7 wherein the first specified time is greater than the second specified time.

14. The machine-readable medium of claim 7 wherein the second specified time is greater than the first specified time.

15. A system comprising:
   a processor including a power management system (PMS) to
      monitor processor utilization, wherein the processor has a plurality of performance levels,
      automatically transition the processor to a higher performance level if it is determined that the processor utilization has remained above a switch-up level for a first specified time, and
      automatically transition the processor to a next lower performance level, if any, if it is determined that the processor utilization has remained below a switch-down level for a second specified time;
   a power supply circuit coupled to the processor;
   the power supply circuit coupled to a power supply; and
   an input/output (I/O) controller coupled to the power supply circuit, the I/O controller, in response to an external signal, to transmit a signal to the power supply circuit to initiate the transitioning of the processor.

16. The system of claim 15, wherein the switch-up level is approximately 95% of a current processor performance level.

17. The system of claim 15, wherein the switch-down level is approximately 95% of the next lower processor performance level.

* * * * *